US012639182B2

(12) United States Patent
Wilkinson et al.

(10) Patent No.: US 12,639,182 B2
(45) Date of Patent: May 26, 2026

(54) PROCESSING INSTRUCTIONS AT A PROCESSING UNIT CONFIGURED TO PERFORM PARALLEL PROCESSING

(71) Applicant: Imagination Technologies Limited, Kings Langley (GB)

(72) Inventors: Daniel Wilkinson, Hertfordshire (GB); Ian King, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 18/907,541

(22) Filed: Oct. 6, 2024

(65) Prior Publication Data

US 2025/0165368 A1      May 22, 2025

(30) Foreign Application Priority Data

Oct. 6, 2023      (GB) ...................................... 2315321
Oct. 6, 2023      (GB) ...................................... 2315322

(51) Int. Cl.
*G06F 11/22*          (2006.01)
*G06F 11/16*          (2006.01)
(52) U.S. Cl.
CPC ...... *G06F 11/2236* (2013.01); *G06F 11/1608* (2013.01); *G06F 2201/86* (2013.01)
(58) Field of Classification Search
CPC ............. G06F 11/1608; G06F 11/1629; G06F 11/2236; G06F 11/2242; G06F 11/277; G06F 2201/86
See application file for complete search history.

(56) References Cited

U.S. PATENT DOCUMENTS

| | | | | |
|---|---|---|---|---|
| 5,583,786 A | * | 12/1996 | Needham | ............ G06F 11/2236 |
| | | | | 714/724 |
| 5,732,209 A | | 3/1998 | Vigil et al. | |
| 7,206,969 B2 | | 4/2007 | Shidla et al. | |
| 7,263,642 B1 | * | 8/2007 | Makar | ............ G01R 31/318566 |
| | | | | 714/736 |

(Continued)

FOREIGN PATENT DOCUMENTS

GB          2604089 A      8/2022

*Primary Examiner* — Joseph R Kudirka
(74) *Attorney, Agent, or Firm* — Potomac Law Group, PLLC; Vincent M DeLuca

(57) ABSTRACT

A method of processing instructions at a processing unit having a parallel processing engine. During a mission cycle, a first set of mission operand values is processed in accordance with a mission instruction at a first processing instance to generate a first mission output. In parallel, a second set of mission operand values is processed in accordance with the mission instruction at a second processing instance to generate a second mission output. During a test cycle, a first set of test operand values is processed in accordance with a test instruction at the first processing instance to generate a first test output, and in parallel, a second set of test operand values is processed in accordance with the test instruction at the second processing instance to generate a second test output, where the first set of test operand values is the same as the second set of test operand values. The first test output and the second test output are compared and a fault signal is raised if the compared test outputs do not match.

20 Claims, 4 Drawing Sheets

(56)                     References Cited

U.S. PATENT DOCUMENTS

| | | | |
|---|---|---|---|
| 7,272,751 B2 * | 9/2007 | Beacom .............. | G06F 11/2236 |
| | | | 714/E11.166 |
| 7,975,172 B2 | 7/2011 | Hickey et al. | |
| 10,628,274 B2 | 4/2020 | Gulati et al. | |
| 11,288,145 B2 * | 3/2022 | McNamara ........... | G06F 9/5027 |
| 11,467,830 B2 * | 10/2022 | Deadman ............ | G06F 11/1004 |
| 2008/0307275 A1 | 12/2008 | Wong et al. | |
| 2013/0159799 A1 | 6/2013 | Brown et al. | |
| 2014/0208165 A1 | 7/2014 | Kang et al. | |
| 2021/0165730 A1 | 6/2021 | Surya et al. | |
| 2022/0244956 A1 | 8/2022 | Deadman et al. | |

* cited by examiner

PROCESSING INSTRUCTIONS AT A PROCESSING UNIT CONFIGURED TO PERFORM PARALLEL PROCESSING

CROSS-REFERENCE TO RELATED APPLICATIONS AND CLAIM OF PRIORITY

This application claims foreign priority under 35 U.S.C. 119 from United Kingdom patent application Nos. 2315322.4 and 2315321.6 both filed on 6 Oct. 2023, the contents of which are incorporated by reference herein in their entirety.

TECHNICAL FIELD

The present disclosure is directed to a processing unit configured to perform parallel processing, and a method of processing instructions at a processing unit configured to perform parallel processing.

BACKGROUND

In safety-critical systems, at least some of the components of the system must meet safety goals sufficient to enable the system as a whole to meet a level of safety deemed necessary for the system. For example, in most jurisdictions, seat belt retractors in vehicles must meet specific safety standards in order for a vehicle provided with such devices to pass safety tests. Likewise, vehicle tyres must meet specific standards in order for a vehicle equipped with such tyres to pass the safety tests appropriate to a particular jurisdiction. Safety-critical systems are typically those systems whose failure would cause a significant increase in the risk to the safety of people or the environment.

Processing systems (e.g. data processing systems) often form an integral part of safety-critical systems, either as dedicated hardware or as processors for running safety-critical software. For example, fly-by-wire systems for aircraft, driver assistance systems, railway signalling systems and control systems for medical devices would typically all be safety-critical systems running on processing systems. Where processing systems form an integral part of a safety-critical system it is necessary for the processing system itself to satisfy safety goals such that the system as a whole can meet the appropriate safety level. In the automotive industry, the safety level is normally an Automotive Safety Integrity Level (ASIL) as defined in the functional safety standard ISO 26262.

Increasingly, processing systems for safety-critical systems comprise a processor running software. Both the hardware and software elements must meet specific safety goals.

Software failures are typically systematic failures due to programming errors or poor error handling. For software, the safety goals are typically achieved through rigorous development practices, code auditing and testing protocols.

For the hardware elements of a processing system, such as its processing unit(s), safety goals may be expressed as a set of metrics, such as: a maximum number of failures in a given period of time (often expressed as Failures in Time, or FIT); and the effectiveness of mechanisms for detecting single point failures (e.g. Single Point Fault Metric, or SPFM) and latent failures (e.g. Latent Fault Metric, or LFM). It is possible for the hardware elements of a processing system to develop permanent faults. It may not be possible for those hardware elements to recover from (e.g. return to normal operation after developing) a permanent fault. It is also possible for the hardware elements of a processing system to develop transient faults. For example, transient faults can be introduced into hardware by transient events (e.g. due to ionizing radiation, voltage spikes, or electromagnetic pulses). In binary systems, these types of transient events can cause random bit-flipping in memories and along the data paths of a processor. It may be possible for the hardware elements of a processing system to recover from (e.g. return to normal operation after developing) a transient fault. For example, this could be achieved by returning those hardware elements to a known state—e.g. by performing a "reset" of those hardware elements. In general, transient or permanent faults in memory or data paths that move data without transforming it can be protected against and/or corrected for by error correcting code (ECC) and/or parity bit check error detection mechanisms. By contrast, error correcting code (ECC) and parity bit check error detection mechanisms often cannot be used to protect against and/or correct transient or permanent faults in processing logic that does transform data.

Driver-assistance systems and autonomous vehicle systems are examples of safety-critical systems that can incorporate processing systems which are suitable for such safety-critical applications.

In an example, driver-assistance systems often provide computer-generated graphics illustrating hazards, lane position, and other information to the driver. Typically this will lead the vehicle manufacturer to replace a conventional instrument cluster with a computer-generated instrument cluster which also means that the display of safety-critical information such as speed and vehicle fault information becomes computer-generated. Such processing demands can be met by processing units that are capable of performing parallel processing. For example, graphics processing units (GPUs) are typically capable of performing parallel processing. Central processing units (CPUs) of a suitable type can also be capable of performing parallel processing. Driver-assistance systems typically require a processing unit which meets ASIL level B of ISO 26262.

In another example, autonomous vehicle systems typically process very large amounts of data (e.g. from RADAR, LIDAR, map data and vehicle information) in real-time in order to make safety-critical decisions hundreds of times a second. Processing units that are capable of performing parallel processing (e.g. GPUs and/or CPUs) can also help meet such processing demands. Autonomous vehicle systems typically require a processing unit which meets the most stringent ASIL level D of ISO 26262.

It is to be understood that driver-assistance systems and autonomous vehicle systems are just examples of safety-critical systems that use processing units capable of performing parallel processing that are required to meet the ASIL B or ASIL D standards of ISO 26262. It is to be understood that many other safety-critical vehicle systems may use processing units capable of performing parallel processing that are required to meet the ASIL B or ASIL D standards of ISO 26262.

In order to be certified as meeting the ASIL B or ASIL D standards of ISO 26262, it may need to be demonstrated that a range of different faults that might occur at a processing unit can be detected within a predetermined time period of those faults occurring. As such, it is desirable to provide a method of testing a processing unit configured to perform parallel processing in order to detect faults at that processing unit.

It is also to be understood that processing units capable of performing parallel processing can be used in other applications, other than the automotive applications described so far. For example, processing units capable of performing parallel processing can be used in super-computing/data centre applications. In said other applications, it can also be desirable to provide a method of testing a processing unit configured to perform parallel processing in order to detect faults at that processing unit—e.g. such that appropriate action(s) can be timely taken to recover from those faults, and/or such that faulty or defective parts can be identified and replaced—whether or not those other applications are subject to safety standards.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the present invention there is provided a processing unit configured to perform parallel processing, the processing unit comprising a parallel processing engine, the parallel processing engine comprising: a plurality of processing instances configured to process instructions in parallel; test instruction insertion logic configured to: identify an idle cycle of the parallel processing engine; and insert a test instruction for processing, during the idle cycle, by each of the plurality of processing instances so as to generate a respective plurality of test outputs; and check logic configured to: compare: a test output generated, during the idle cycle, by a first processing instance of the plurality of processing instances; and a test output generated, during the idle cycle, by a second processing instance of the plurality of processing instances; and raise a fault signal if the compared test outputs do not match.

An idle cycle may be a cycle of the parallel processing engine during which the parallel processing engine is not scheduled to process any other instructions.

One or more operand values may be processed in accordance with the test instruction, and the test instruction insertion logic may be configured to pseudo-randomly generate the one or more operand values. The test instruction insertion logic may be configured to pseudo-randomly generate the one or more operand values in dependence on one or more predetermined seeds. The test instruction insertion logic may be configured to pseudo-randomly generate the one or more operand values using one or more linear-feedback shift registers that generate the one or more operand values in dependence on the one or more predetermined seeds.

The test instruction may comprise one or more control fields, and the test instruction insertion logic may be configured to generate the one or more control fields using constrained random generator logic.

For a test instruction control information-operand data combination, operand data is processed in accordance with that test instruction, and that test instruction comprises control information that defines the operation(s) to be performed by the plurality of processing instances on that operand data, and the test instruction insertion logic may be configured to insert a plurality of different test instruction control information-operand data combinations for processing by each of the plurality of processing instances.

The plurality of different test instruction control information-operand data combinations may be configured to, cumulatively, cover at least a predetermined percentage of the logic comprised by the parallel processing engine.

The plurality of different test instruction control information-operand data combinations may comprise one or more test instruction control information-operand data combinations generated by the test instruction insertion logic and one or more pre-generated test instruction control information-operand data combinations stored by the test instruction insertion logic.

The test instruction insertion logic may be configured to insert, within a predetermined period of time, each of the plurality of different test instruction control information-operand data combinations for processing by each of the plurality of processing instances.

The test instruction insertion logic may be configured to: identify that less than a threshold amount of time of the predetermined period of time is remaining and/or greater than a threshold number of test instruction control information-operand data combinations of the plurality of different test instruction control information-operand data combinations are yet to be processed within the predetermined period of time; and in response to said identifying, cause one or more idle cycles of the parallel processing engine.

The test instruction insertion logic may be configured to cause one or more idle cycles of the parallel processing engine by causing a scheduler configured to schedule other instructions for processing by the parallel processing engine to not schedule other instructions for processing by the parallel processing engine during one or more cycles of the parallel processing engine.

The processing unit may comprise a scheduler configured to schedule other instructions to be processed by the parallel processing engine, and the test instruction insertion logic may be configured to identify the idle cycle and insert the test instruction for processing independently of the scheduler.

The test instruction insertion logic may be configured to, prior to identifying the idle cycle and inserting the test instruction for processing, identify that one or more other instructions have been processed by the parallel processing engine.

The plurality of test outputs may not be written to a memory external of the parallel processing engine.

The test instruction insertion logic may be implemented using fixed function hardware. The check logic may be implemented using fixed function hardware.

The parallel processing engine may be an integer pipeline, a floating-point pipeline or a complex pipeline.

Each processing instance of the plurality of processing instances may be identical to each of the other processing instances of the plurality of processing instances.

The processing unit may be a graphics processing unit (GPU) or a central processing unit (CPU).

According to a second aspect of the present invention there is provided a method of processing instructions at a processing unit configured to perform parallel processing, the processing unit comprising a parallel processing engine, the parallel processing engine comprising a plurality of processing instances configured to process instructions in parallel, the method comprising: identifying an idle cycle of the parallel processing engine; inserting a test instruction for processing, during the idle cycle, by each of the plurality of processing instances so as to generate a respective plurality of test outputs; comparing: a test output generated, during the idle cycle, by a first processing instance of the plurality of processing instances; and a test output generated, during the idle cycle, by a second processing instance of the plurality of processing instances; and raising a fault signal if the compared test outputs do not match.

According to a third aspect of the present invention there is provided a method of processing instructions at a processing unit configured to perform parallel processing, the processing unit comprising a parallel processing engine, the parallel processing engine comprising a first processing instance and a second processing instance, the method comprising: during a mission cycle: processing a first set of one or more mission operand values in accordance with a mission instruction at the first processing instance so as to generate a first mission output; and in parallel, processing a second set of one or more mission operand values in accordance with the mission instruction at the second processing instance so as to generate a second mission output; wherein the first set of one or more mission operand values is different to the second set of one or more mission operand values; and during a test cycle: processing a first set of one or more test operand values in accordance with a test instruction at the first processing instance so as to generate a first test output; and in parallel, processing a second set of one or more test operand values in accordance with the test instruction at the second processing instance so as to generate a second test output; wherein the first set of one or more test operand values is the same as the second set of one or more test operand values; comparing the first test output and the second test output; and raising a fault signal if the compared test outputs do not match.

The test cycle may occur during an idle cycle of the parallel processing engine, wherein an idle cycle is a cycle of the parallel processing engine during which the parallel processing engine is not scheduled to process any mission instructions.

The method may further comprise: identifying an idle cycle of the parallel processing engine; and inserting the test instruction for processing, during the idle cycle, by the first processing instance and the second processing instance.

The method may comprise processing instructions at the parallel processing engine during a plurality of cycles of the parallel processing engine, the plurality of cycles comprising one or more mission cycles and one or more test cycles, wherein x % of the plurality of cycles are mission cycles and (100–x)% of the plurality of cycles are test cycles. For example, wherein x>50.

The mission instruction may define a portion of work for the first processing instance and the second processing instance, to perform. The work may comprise one or more of image processing, video processing, graphics processing and/or general processing. The work may be safety-critical work.

The first processing instance may be identical to the second processing instance.

The first test output and the second test output may not be written to a memory external of the parallel processing engine.

The method may comprise: scheduling, using a scheduler, the mission instruction for processing by the first processing instance and the second processing instance; and inserting, using test instruction insertion logic, the test instruction for processing by the first processing instance and the second processing instance; wherein the test instruction insertion logic acts independently of the scheduler.

The method may further comprise pseudo-randomly generating the one or more test operand values using test instruction insertion logic.

The test instruction insertion logic may be implemented in fixed function hardware.

The test instruction may comprise one or more control fields that define the operation(s) to be performed by the processing instances on their respective set of operand values, the one or more control fields being pre-generated.

The method may comprise comparing the first test output and the second test output using check logic implemented in fixed function hardware.

The processing unit may be a graphics processing unit (GPU) or a central processing unit (CPU).

The parallel processing engine may be an integer pipeline, a floating-point pipeline or a complex pipeline.

According to a fourth aspect of the present invention there is provided a processing unit configured to perform parallel processing, the processing unit comprising a parallel processing engine, the parallel processing engine comprising a first processing instance and a second processing instance, the parallel processing engine being configured to: during a mission cycle: process a first set of one or more mission operand values in accordance with a mission instruction at the first processing instance so as to generate a first mission output; and in parallel, process a second set of one or more mission operand values in accordance with the mission instruction at the second processing instance so as to generate a second mission output; wherein the first set of one or more mission operand values is different to the second set of one or more mission operand values; and during a test cycle: process a first set of one or more test operand values in accordance with a test instruction at the first processing instance so as to generate a first test output; and in parallel, process a second set of one or more test operand values in accordance with the test instruction at the second processing instance so as to generate a second test output; wherein the first set of one or more test operand values is the same as the second set of one or more test operand values; compare the first test output and the second test output; and raise a fault signal if the compared test outputs do not match.

The processing unit may be embodied in hardware on an integrated circuit. There may be provided a method of manufacturing, at an integrated circuit manufacturing system, the processing unit. There may be provided an integrated circuit definition dataset that, when processed in an integrated circuit manufacturing system, configures the system to manufacture the processing unit. There may be provided a non-transitory computer readable storage medium having stored thereon a computer readable description of the processing unit that, when processed in an integrated circuit manufacturing system, causes the integrated circuit manufacturing system to manufacture an integrated circuit embodying the processing unit.

There may be provided an integrated circuit manufacturing system comprising: a non-transitory computer readable storage medium having stored thereon a computer readable description of the processing unit; a layout processing system configured to process the computer readable description so as to generate a circuit layout description of an integrated circuit embodying the processing unit; and an integrated circuit generation system configured to manufacture the processing unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
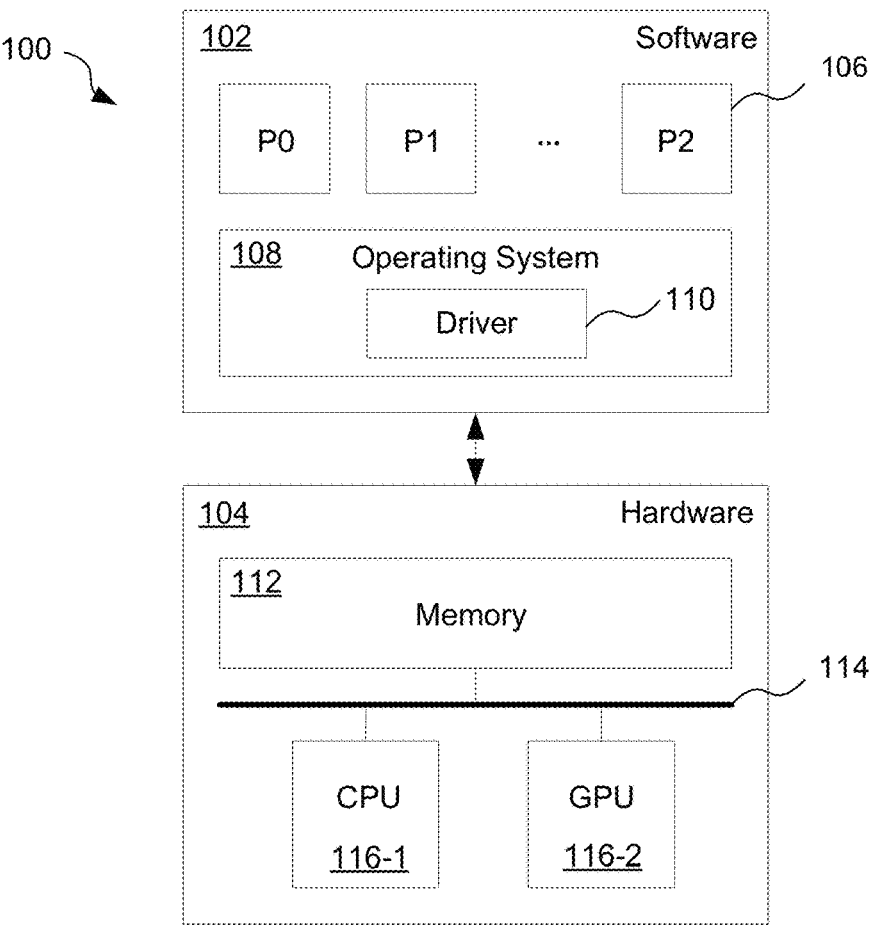
FIG. 1 shows an example processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 shows an example processing system 100. The processing system 100 comprises hardware in a hardware environment 104 and software in a software environment 102. Within the hardware environment 104, the processing system 100 comprises a central processing unit (CPU) 116-1 and a graphics processing unit (GPU) 116-2. A GPU is typically capable of performing parallel processing. Graphics processing unit (GPU) 116-2 is described herein as an example of a processing unit that is configured to perform parallel processing. A CPU (e.g. a suitable type of CPU) can also be capable of performing parallel processing. As such, central processing unit (CPU) 116-1 is also described herein as an example of a processing unit that is configured to perform parallel processing. It is to be understood that the principles described herein could also be applied to any other suitable type of processing unit that is configured to perform parallel processing—such as a digital signal processing unit (e.g. DSP) that is capable of performing parallel processing. It is also to be understood that the principles described herein need not be applied to a processing unit that is configured to exclusively perform parallel processing. That is, a processing unit configured to perform parallel processing may comprise some processing logic that is configured to perform parallel processing, and some other processing logic that is not configured to perform parallel processing. It is also to be understood that a processing system need not comprise both a CPU and a GPU.

CPU 116-1 and GPU 116-2 may have any suitable architecture. CPU 116-1 and/or GPU 116-2 may be operable to perform any kind of graphics, image or video processing, general processing and/or any other type of data processing—such as the processing of general computing tasks, particularly those which can be readily parallelised. Examples of general computing tasks include signal processing, audio processing, computer vision, physical simulations, statistical calculations, neural networks and cryptography.

Within the hardware environment 104, the processing system 100 also comprises a memory 112, and one or more data buses and/or interconnects 114 over which the CPU 116-1 and GPU 116-2, and memory 112, may communicate. CPU 116-1 and/or GPU 116-2 may be implemented on a chip (e.g. semiconductor die and/or integrated circuit package) and memory 112 may not be physically located on the same chip (e.g. semiconductor die and/or integrated circuit package) as the CPU 116-1 and/or GPU 116-2. As such, memory 112 may be referred to as "off-chip memory". Memory 112 may be used to store data for CPU 116-1, GPU 116-2 and/or other processing units (not shown in FIG. 1) of the processing system 100. As such, memory 112 may be referred to as "system memory" and/or "global memory". Memory 112 may be a dynamic random access memory (e.g. DRAM).

A plurality of processes (P0, P1, P2) 106 may be executed within the software environment 102. An operating system 108 may provide an abstraction of the available hardware to the processes 106. The operating system may include a driver 110 for the CPU 116-1 and/or GPU 116-2 so as to expose the functionalities of the CPU 116-1 and/or GPU 116-2 to the processes. All or part of the software environment 102 may be provided as firmware.

In an example, the processing system 100 forms part of a vehicle control system, with the processes each performing one or more control functions of the vehicle, such as instrument cluster display, entertainment system, engine management, climate control, lane control, steering correction, automatic braking systems, etc. One or more of the processes 106 may be safety-critical processes. Processes 106 may comprise a mixture of safety-critical processes which must be executed according to a predefined safety level and non-safety-critical processes which do not need to be executed according to a predefined safety level.

Figure 2:
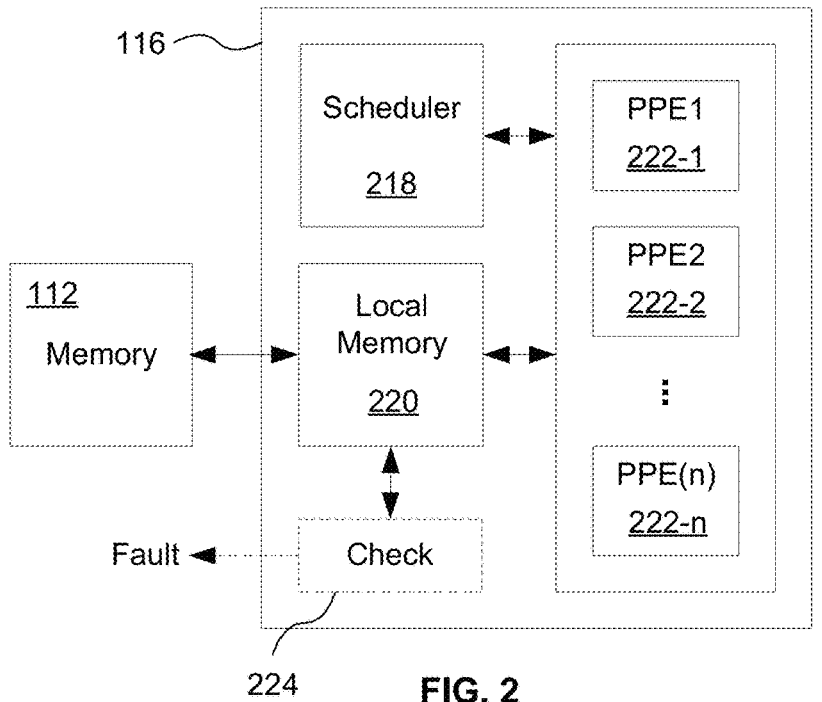
FIG. 2 shows an example processing unit configured to perform parallel processing.

FIG. 2 shows an example processing unit 116 configured to perform parallel processing. CPU 116-1 and/or GPU 116-2 shown in FIG. 1 may have the same properties as processing unit 116 shown in FIG. 2.

Processing unit 116 comprises a plurality of parallel processing engines 222, a scheduler 218 and local memory 220. Processing unit 116 may also comprise a check unit 224. Memory 112 shown in FIG. 2 may have the same properties as memory 112 shown in FIG. 1.

Each parallel processing engine 222 comprises a plurality of processing instances (e.g. "pipes") configured to process instructions in parallel (as will be described in further detail herein). In other words, each parallel processing engine 222 can be configured to perform Single Instruction, Multiple Data (SIMD) processing. Each parallel processing engine may be an integer pipeline, a floating-point pipeline, a complex (e.g. special function unit) pipeline, identical multipliers within a vector processing unit or other arithmetic logic unit, or any other suitable type of parallel processing engine. The plurality of parallel processing engines 222 may comprise multiple different types of parallel processing engine, and/or multiple parallel processing engines of the same type. A processing unit configured to perform parallel processing typically comprises one or more parallel processing engines. In FIG. 2, the processing unit 116 is shown comprising three parallel processing engines—labelled as 222-1, 222-2 and 222-*n*. It is to be understood that a processing unit configured in accordance with the principles described herein could comprise any suitable number of parallel processing engines (e.g. including a single parallel processing engine).

Scheduler 218 can be configured to schedule instructions (e.g. "mission" or "non-test" instructions) for processing by the parallel processing engines 222. Each instruction may define a portion of work for the processing instances of a parallel processing engine to perform. For example, the work may comprise one or more of image processing, video processing, graphics processing and/or general (e.g. "compute") processing. The work may be safety-critical work.

Operand data comprising a set of one or more operand values may be processed by a processing instance of a parallel processing engine in accordance with an instruction. Each operand value may comprise one or more bits—e.g. 32 bits. The instruction itself may comprise one or more operands that include reference(s) to memory location(s) in which the operand data that is to be processed is stored. In a processing cycle of a parallel processing engine 222 in which an instruction is being processed, each processing instance of that parallel processing engine 222 may operate on different operand data (e.g. a different set of one or more operand values) in accordance with that instruction. That is, as described herein, each parallel processing engine 222 may be configured to perform Single Instruction, Multiple Data (SIMD) processing. An instruction may comprise control information that includes one or more control fields that define the operation(s) to be performed by each of the processing instances on their respective operand data—such as, for example, add, multiply, fused multiply-add and/or any other suitable type of operations.

It is to be understood that, in examples where the processing unit 116 comprises a plurality of parallel processing engines 222, the scheduler 218 may be configured to schedule instructions to any (e.g. all) of the plurality of parallel processing engines 222. The parallel processing engine of the plurality of parallel processing engines 222 to which an instruction is scheduled by scheduler 218 may depend on the type of processing required by that instruction—e.g. integer, floating-point, complex etc.

Local memory 220 may comprise one or more data storage units arranged in any suitable manner. Local memory 220 may comprise static random access memory (e.g. SRAM) and/or dynamic random access memory (e.g. DRAM). Local memory 220 may include one or more caches, registers and/or buffers. The processing unit 116 may be implemented on a chip (e.g. semiconductor die and/or integrated circuit package) and local memory 220 may be physically located on the same chip (e.g. semiconductor die and/or integrated circuit package) as the processing unit 116. As such, local memory 220 may be referred to as "on-chip memory". Local memory 220 can be configured to receive data (e.g. operand data) from memory 112. The parallel processing engines 222 can access local memory 220 without consuming memory bandwidth to memory 112. For example, a parallel processing engine may read in operand data (e.g. sets of one or more mission or non-test operand values) stored in memory 220 in order to process an instruction (e.g. a mission or non-test instruction), and/or write output data (e.g. mission or non-test output data) generated during the processing of that instruction to local memory 220. Both memory 112 and local memory 220 may be described as being external of the parallel processing engines 222. Each parallel processing engine 222 may comprise one or more units of "private" memory (not shown in the Figures) that are dedicated to that parallel processing engine (e.g. not accessible by any other parallel processing engine of the processing unit).

Work to be performed by a processing unit that is configured to perform parallel processing can be arranged into so called "workgroups" and "work-items". A workgroup may comprise a plurality of work-items, where that plurality of work-items can be processed in parallel (e.g. at a parallel processing engine of that processing unit).

Workgroups may be processed independently of each other (e.g. at different parallel processing engines of a processing unit, or in series at a single parallel processing engine of a processing unit). Work-items within the same workgroup may be able to share access during their processing to private memory (not shown in the Figures) dedicated to the parallel processing engine of the processing unit processing those work-items. That is, work-items within the same workgroup may be able to share access during their processing to memory dedicated to the parallel processing engine of the processing unit processing those work-items. By contrast, different workgroups may not be able to share access during their processing to memory dedicated to a certain parallel processing engine of the processing unit.

In an example, a program may define a series of one or more instructions to be executed. That program may be executed for a data-item. For example, the program may be a shader program, and the data-item for which that shader program is to be executed may be ray or pixel data. In order to exploit the SIMD capabilities of a parallel processing engine, a workgroup can be formed by gathering a plurality of data-items (e.g. a plurality of different ray/pixel data) for which the same program (e.g. shader program) is to be executed. That workgroup comprises a plurality of instances/invocations of the program, each of which corresponds to a respective data-item of the plurality of data-items for which that program is to be executed. Each of said instances/invocations of the program is a work-item. As such, each work-item can define a series of one or more instructions to be executed for a data-item. By processing the workgroup at a parallel processing engine as described herein, the same program can be efficiently executed for a plurality of different data-items.

The number of work-items comprised by a workgroup may be limited. In an example, a workgroup may comprise up to 128 work-items. In this example, if more than 128 work-items are to perform the same program, then more than one workgroup will be associated with that program. It is to be understood that the "workgroup" and "work-item" terminology used herein is not intended to be limiting, and that other terminology could be used to describe the same concepts. For example, a work-item as described herein could alternatively be referred to as an "invocation" or a "thread", whilst a workgroup as described herein could alternatively be referred to as a "thread block" or a "thread-group".

Figure 3:
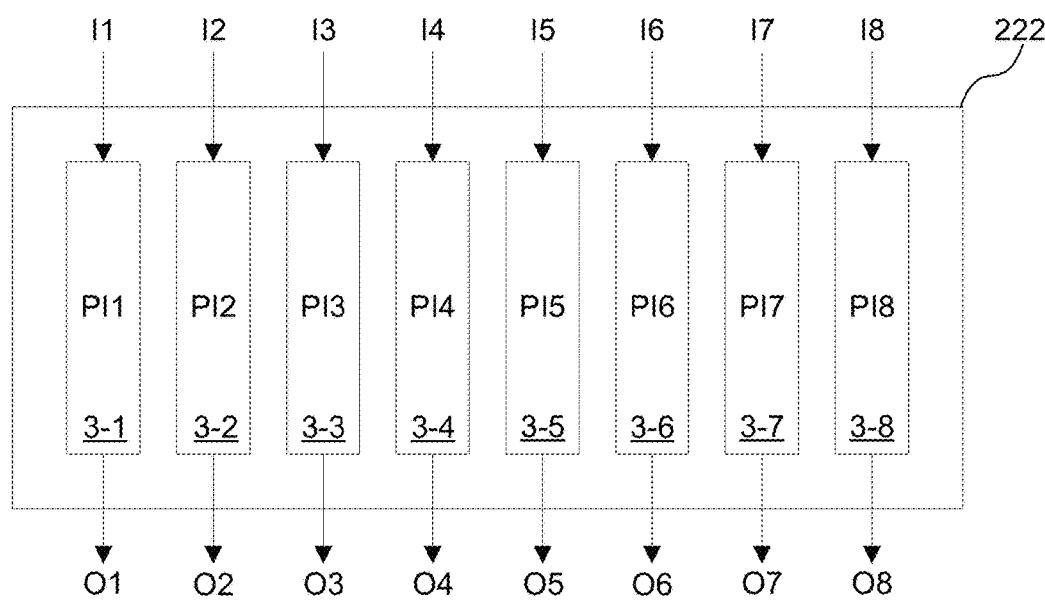
FIG. 3 shows an example parallel processing engine comprising a plurality of processing instances.

FIG. 3 shows an example parallel processing engine 222 comprising a plurality of processing instances (PI) 3. Each parallel processing engine 222 shown in FIG. 2 may have the same properties as parallel processing engine 222 shown in FIG. 3.

Parallel processing engine 222 comprises a plurality of processing instances (PI) 3 configured to process instructions in parallel. In other words, as described herein, parallel processing engine 222 may be configured to perform Single Instruction, Multiple Data (SIMD) processing. That is, parallel processing engine 222 comprises a first processing instance (PI1) 3-1 configured to process a first set of one or more operand values (I1) so as to generate a first output (O1), a second processing instance (PI2) 3-2 configured to process a second set of one or more operand values (I2) so as to generate a second output (O2), a third processing instance (PI3) 3-3 configured to process a third set of one or more operand values (I3) so as to generate a third output (O3), a fourth processing instance (PI4) 3-4 configured to process a fourth set of one or more operand values (14) so as to generate a fourth output (O4), a fifth processing instance (PI5) 3-5 configured to process a fifth set of one or more operand values (I5) so as to generate a fifth output (O5), a sixth processing instance (PI6) 3-6 configured to process a sixth set of one or more operand values (I6) so as to generate a sixth output (O6), a seventh processing instance (PI7) 3-7 configured to process a seventh set of one or more operand values (I7) so as to generate a seventh output (O7) and an eighth processing instance (PI8) 3-8 configured to process an eighth set of one or more operand values (I8) so as to generate an eight output (O8)—where those eight sets of one or more operand values (I1 to I8) are processed in accordance with the same instruction, in parallel (e.g. substantially contemporaneously, e.g. during the same processing cycle). Each of the first, second, third, fourth, fifth, sixth, seventh and eighth sets of one or more operand values may be different. During a processing cycle of a parallel processing engine, a number of sets of one or more operand values equal to the number of processing instances of that parallel processing engine can be processed in accordance with the same instruction, in parallel (e.g. substantially contemporaneously).

Each of the processing instances may comprise processing logic for performing one or more operations (e.g. add, multiply, fused multiply-add or any other suitable types of operations), or combinations thereof, on operand data in accordance with the instruction being processed by that processing instance. Said processing logic may comprise fixed function processing logic, configurable processing logic, or any suitable combination of fixed function and configurable processing logic. Each of the processing instances comprised by a parallel processing engine may be identical to one another. That is, each processing instance of the plurality of processing instances may be identical to each of the other processing instances of the plurality of processing instances. In other words, the parallel processing engine may comprise a plurality of identical processing instances.

Workgroups comprising more work-items than the number of processing instances comprised by the parallel processing engine may be processed in a number of batches at that parallel processing engine. For example, a workgroup comprising 32 work-items scheduled to be processed at a parallel processing engine comprising eight processing instances may be processed in four batches at that parallel processing engine—e.g. such that work-items 1 to 8 are processed in parallel in a first batch, work-items 9 to 16 are processed in parallel in a second batch, work-items 17 to 24 are processed in parallel in a third batch, and work-items 25 to 32 are processed in parallel in a fourth batch.

In FIG. 3, the parallel processing engine 222 is shown comprising eight processing instances 3—labelled as PI1 3-1 to PI8 3-8. It is to be understood that a parallel processing engine configured in accordance with the principles described herein could comprise any suitable number of processing instances (e.g. including just two processing instances). Typically, the number of processing instances comprised by a parallel processing engine is equal to a power of two (e.g. $2^1=2$, $2^2=4$, $2^3=8$ etc.) or a multiple of two—although this need not be the case.

As described herein, it is desirable to provide a method of testing a processing unit configured to perform parallel processing in order to detect faults at that processing unit. A first typical method of testing a processing unit configured to perform parallel processing involves duplicating each "mission workgroup" received for processing so as to form a mission workgroup and a "redundant workgroup". The mission workgroup that is duplicated can be one that defines "mission work" to be performed by the processing unit. Mission work may comprise one or more of image processing, video processing, graphics processing and/or general (e.g. "compute") processing. The mission work may be safety-critical work. Said mission work may be submitted by the processes 106 executing at the processing system 100 shown in FIG. 1.

Referring back to FIG. 2, in this first typical method, the mission workgroup and the redundant workgroup can both be processed by the parallel processing engines 222 (e.g. each processed by different parallel processing engines of the processing unit) so as to form a "mission result" and a "redundant result". The mission result and the redundant result can be compared (e.g. by check unit 224) and a fault signal can be raised if the mission result and the redundant result do not match. That is, non-matching mission and redundant results can indicate that a fault has occurred in at least one of the parallel processing engines 222 of the processing unit 116 used to process the mission workgroup and the redundant workgroup. This first typical method can provide excellent diagnostic coverage (e.g. in terms of the percentage of faults, out of all possible faults, that a safety mechanism can detect). That said, whilst there can be some optimisations, using this first typical method roughly means that the time taken, and the processing power used, to process each workgroup received for processing by a processing unit is doubled. As such, this can also mean that the through-put of the processing unit processing those workgroups is halved.

A second typical method of testing a processing unit is to provide pairs of identical processing units in a dual lockstep arrangement (not shown in the Figures). As in the first typical approach, each mission workgroup for processing is duplicated so as to form a mission workgroup and a redundant workgroup. In a dual lockstep arrangement, one processing unit of the pair of processing units processes the mission workgroup so as to form a mission result whilst the other processing unit of the pair of processing units processes the redundant workgroup so as to form a redundant result. The mission result and the redundant result can be compared, and a fault signal can be raised if the mission result and the redundant result do not match. That is, non-matching mission and redundant results can indicate that a fault has occurred in at least one of the processing units of the pair of processing units in the dual lockstep arrangement. However, since a second processing unit is required, dual lockstep processing systems necessarily consume double the chip area. Further, as in the first typical approach, the time taken, and the processing power used, to process each workgroup is doubled.

Described herein is a processing unit configured to perform parallel processing, and a method of processing instructions at a processing unit configured to perform parallel processing, that are intended to address one or more of the problems identified in the preceding paragraphs.

In the following, it is to be understood that a mission (e.g. non-test) instruction may define a portion of mission work (as defined herein) for a processing instance of a parallel processing engine to perform. Scheduler 218 shown in FIG. 2 may be configured to schedule mission instructions for processing by a parallel processing engine. It is also to be understood that a "test instruction" may not define a portion of mission work (as defined herein). Scheduler 218 shown in FIG. 2 may not be configured to schedule test instructions for processing by a parallel processing engine.

Figure 4:
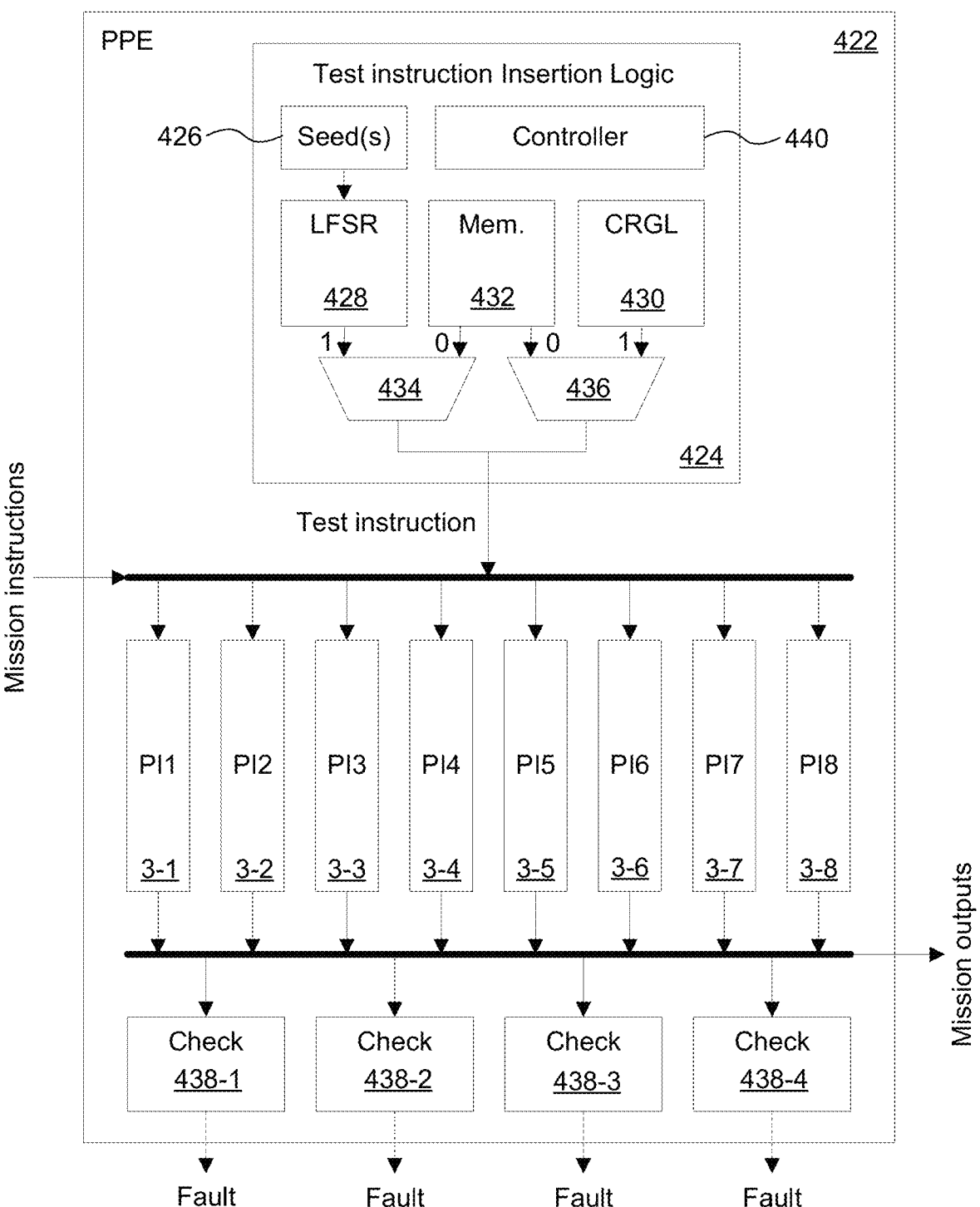
FIG. 4 shows an example parallel processing engine according to the principles described herein.

FIG. 4 shows an example parallel processing engine 422 according to the principles described herein. Each parallel processing engine 222 shown in FIG. 2 may have the same properties as parallel processing engine 422 shown in FIG. 4.

Parallel processing engine 422 may be an integer pipeline, a floating-point pipeline, a complex (e.g. special function unit) pipeline, identical multipliers within a vector processing unit or other arithmetic logic unit, or any other suitable type of parallel processing engine. Parallel processing engine 422 comprises a plurality of processing instances 3 configured to process instructions in parallel—said processing instances 3 having the same properties as the processing instances 3 described herein with reference to FIG. 3. That is, parallel processing engine 422 may be configured to perform Single Instruction, Multiple Data (SIMD) processing.

Parallel processing engine 422 can process a plurality of sets of one or more mission operand values in accordance with a mission instruction, in parallel, so as to generate a respective plurality of mission outputs in the same manner as parallel processing engine 222 shown in FIG. 3 is described herein processing a plurality of sets of one or more operand values (e.g. I1 to I8) in accordance with an instruction, in parallel, so as to generate a respective plurality of outputs (e.g. O1 to O8).

In FIG. 4, as in FIG. 3, the parallel processing engine 422 is shown comprising eight processing instances 3—labelled as PI1 3-1 to PI8 3-8. It is to be understood that a parallel processing engine configured in accordance with the principles described herein could comprise any suitable number of processing instances (e.g. including just two processing instances).

Parallel processing engine 422 also comprises test instruction insertion logic 424 and check logic 438. In FIG. 4, check logic 438 is shown comprising four check logic instances 438-1, 438-2, 438-3 and 438-4. Test instruction insertion logic 424 and/or check logic 438 may advantageously be implemented using fixed function hardware (e.g. fixed function or dedicated circuitry, e.g. as opposed to software running at general purpose hardware).

Test instruction insertion logic 424 is configured to insert (e.g. inject or input) a test instruction for processing, during a processing cycle, by each of the plurality of processing instances 3 so as to generate a respective plurality of test outputs. In examples, test instruction insertion logic 424 may insert test instructions for processing during idle cycles of the parallel processing engine 422 (as described in further detail in the following paragraphs); and/or test instruction insertion logic 424 may periodically insert test instructions for processing (e.g. according to a predetermined test frequency).

In an example, a test instruction can be processed by each of the plurality of processing instances 3 by processing, in accordance with that test instruction, in parallel, during a processing cycle of the parallel processing engine 422: a first set of one or more test operand values at the first processing instance PI1 so as to generate a first test output, a second set of one or more test operand values at the second processing instance PI2 so as to generate a second test output, a third set of one or more test operand values at the third processing instance PI3 so as to generate a third test output, a fourth set of one or more test operand values at the fourth processing instance PI4 so as to generate a fourth test output, a fifth set of one or more test operand values at the fifth processing instance PI5 so as to generate a fifth test output, a sixth set of one or more test operand values at the sixth processing instance PI6 so as to generate a sixth test output, a seventh set of one or more test operand values at the seventh processing instance PI7 so as to generate a seventh test output, and an eighth set of one or more test operand values at the eighth processing instance PI8 so as to generate an eighth test output. Each of the first, second, third, fourth, fifth, sixth, seventh and eighth sets of one or more test operand values may be duplicates (e.g. copies) of a set of one or more test operand values output by the test instruction insertion logic 424. That is, each of the first, second, third, fourth, fifth, sixth, seventh and eighth set of one or more test operand values may be the same (e.g. identical to one another). As such, it is to be understood that the processing performed, in parallel, during a test processing cycle, by each processing instance should be identical (i.e. by virtue of processing the same set of one or more test operand values in accordance with the same test instruction). Hence, if each of the processing instances is operating without fault, the test outputs generated by each of those processing instances would be expected to match.

Test instruction insertion logic 424 may be implemented in hardware (e.g. using fixed function or dedicated circuitry) within the parallel processing engine 422. That hardware may be physically located at the input of the plurality of processing instances 3.

The test instruction insertion logic 424 may be configured to generate the operand data comprising the set of one or more operand values to be processed in accordance with the test instruction. Each operand value may comprise one or more bits—e.g. 32 bits. The test instruction insertion logic 424 can be configured to pseudo-randomly generate the set of one or more test operand values to be processed in accordance with the test instruction. The test instruction insertion logic 424 may be configured to pseudo-randomly generate the one or more operand values in dependence on one or more predetermined seeds. As would be understood by the skilled person, a linear-feedback shift register can be used to pseudo-randomly generate an output. A seed is a predetermined value (e.g. number) that can be used to set (e.g. prime or initialise) a linear-feedback shift register to a particular stage in its sequence. The one or more predetermined seeds may be stored in private memory 426 (labelled "seed(s)" in FIG. 4) at the parallel processing engine 422—e.g. in one or more registers dedicated to the parallel processing engine 422. That is, the test instruction insertion logic 424 may be configured to pseudo-randomly generate the set of one or more test operand values using one or more linear-feedback shift registers (LFSR) 428 that generate the one or more test operand values in dependence on the one or more predetermined seeds. The set of one or more test operand values to be processed in accordance with the test instruction may be output "directly" by the test instruction insertion logic 424—e.g. rather than the test instruction inserted by the test instruction insertion logic comprising one or more operands that include reference(s) to memory location(s) in a memory external of the parallel processing engine 422 in which the test operand data that is to be processed is stored.

Additionally, or alternatively, the test instruction insertion logic 424 may be configured to generate the control information including the one or more control fields that define the operation(s) to be performed by the processing instances on their respective set of operand values—such as, for example, add, multiply, fused multiply-add and/or any other suitable type of operations. The test instruction insertion logic 424 may be configured to generate the one or more control fields using constrained random generator logic (CRGL) 430. Said constrained random generator logic (CRGL) 430 may itself comprise one or more linear-feedback shift registers that can be primed by one or more predetermined seeds.

In examples where the test instruction insertion logic 424 is configured to generate only one of operand data or the control information, the other of operand data and control information may be fixed (e.g. pre-generated). In these examples, a pre-generated set of one or more operand values or a pre-generated one or more control fields may be stored in private memory 432 at the parallel processing engine 422—e.g. in one or more registers dedicated to the parallel processing engine 422. It is to be understood that private memories 426 and 432 need not be physically separate as shown in FIG. 4—this is schematic only and is not intended to define a strict division between private memories 426 and 432.

A controller 440 of the test instruction insertion logic 424 may be configured to control the generation of the set of one or more operand values to be processed in accordance with the test instruction and/or the one or more control fields comprised by the test instruction. That is, controller 440 may be configured to control the one or more linear-feedback shift registers (LFSR) 428 and/or the constrained random generator logic (CRGL) 430. Configuring the test instruction insertion logic 424 in this way can be advantageous because it may use less memory relative to storing pre-generated operand data and pre-generated control information. Controller 440 may be configured to select a combination of (generated or pre-generated) operand data and (generated or pre-generated) control information for the test instruction to be inserted (e.g. by controlling multiplexers 434 and 436).

The test outputs generated by processing the test instructions need not be written to a memory external of the parallel processing engine 422—e.g. local memory 220 or memory 112 shown in FIG. 2. This is advantageous because it prevents a test output disrupting the processing of mission work—e.g. by displacing (e.g. replacing) a mission output in memory external of the parallel processing engine 422 (e.g. a cache external of the parallel processing engine 442).

Each check logic instance 438-1, 438-2, 438-3 and 438-4 is configured to compare a test output generated by a first processing instance of the plurality of processing instances 3 and a test output generated by a second processing instance of the plurality of processing instances 3. For example, in FIG. 4: check logic instance 438-1 may be configured to compare the test output generated by the first processing instance (PI1) 3-1 and the test output generated by the second processing instance (PI2) 3-2; check logic instance 438-2 may be configured to compare the test output generated by the third processing instance (PI3) 3-3 and the test output generated by the fourth processing instance (PI4) 3-4; check logic instance 438-3 may be configured to compare the test output generated by the fifth processing instance (PI5) 3-5 and the test output generated by the sixth processing instance (PI6) 3-6; check logic instance 438-4 may be configured to compare the test output generated by the seventh processing instance (PI7) 3-7 and the test output generated by the eighth processing instance (PI8) 3-8.

Each test output may comprise one or more bits—e.g. 32 bits. Each check logic instance 438-1, 438-2, 438-3 and 438-4 may be configured to perform a bit-by-bit comparison of two test outputs. Said comparison may be performed to determine whether those two test outputs match (e.g. are the same), e.g. whether the respective bits in each bit position of those two test outputs match (e.g. are the same).

Each check logic instance 438-1, 438-2, 438-3 and 438-4 may be implemented in hardware (e.g. using fixed function or dedicated circuitry) within the parallel processing engine 422. Each check logic instance 438-1, 438-2, 438-3 and 438-4 may be physically located at the output of the plurality of processing instances 3. This is advantageous because the test outputs need not traverse a memory hierarchy (e.g. via local memory 220 and/or memory 112) before being compared elsewhere (e.g. at a check unit 224 external of the parallel processing engine as shown in FIG. 2).

Each check logic instance 438-1, 438-2, 438-3 and 438-4 is configured to raise a fault signal if (e.g. in response to determining that) the test outputs it compared do not match (e.g. are not the same, or differ from one another). For example, check logic instance 438-1 may be configured to raise a fault signal if the test output generated by the first processing instance (PI1) 3-1 and the test output generated by the second processing instance (PI2) 3-2 do not match. A fault signal may be provided in any suitable manner as an output of the parallel processing engine 222. For example, the fault signal may be one or more of: control data; an interrupt; data written out to local memory 220; and/or data written out to memory 112.

When the test outputs of a pair of processing instances do not match, causing a check logic instance to raise a fault signal as described herein, that fault signal indicates that a fault occurred at one of the processing instances of that pair, although the fault signal does not indicate which processing instance of that pair experienced the fault. That is, check logic 438 in accordance with the principles described herein can advantageously indicate that a fault has occurred in at least one of the processing instances that generated the compared (non-matching) test outputs. This is advantageous over the first typical testing method described herein in which a check unit (e.g. check unit 224) may only be able to indicate that a fault has occurred in at least one of the parallel processing engines (e.g. "as a whole") used to process a mission workgroup and a redundant workgroup. That is, check logic in accordance with the principles describes herein can indicate more precisely (e.g. with higher resolution) where in a processing unit a fault has occurred.

It is to be understood that the test outputs need not necessarily be "paired-up" for comparison as shown in FIG. 4. In another example, a selected one of the test outputs may be compared to each of the other test outputs generated in the same processing cycle. For example, check logic may compare the test output generated by the first processing instance to the test outputs generated by each of the second to eighth processing instances, and raise a fault signal if any one of those comparisons identify non-matching test outputs. In yet another example, the processing instances may be grouped into sets of three (or more) processing instances, and, for each set, check logic may compare the three (or more) test outputs generated in the same processing cycle by the processing instances of that set to each other, and raise a fault signal if any one of those test outputs do not match. In this example, that fault signal can indicate at which one of the processing instances the fault occurred. This is because the fault can be assumed to have occurred at the processing instance that generated the test output that does not match the test outputs generated by the two or more other processing instances in the set.

A fault signal may be used in any manner by the processing unit 116 in which the parallel processing engine 422 is incorporated and/or by the processing system 100 at which that processing unit 116 is incorporated. For example, on a fault signal being raised by check unit 438, the processing system 100 may: discard mission output data previously formed by the processing instance(s) associated with that fault signal; cause mission work that had previously been processed by the processing instance(s) associated with that fault signal to be resubmitted to the processing unit 116 for reprocessing; and/or forward the fault signal to an external safety handling system that can invoke a failure handling mode that renders the system comprising the processing system 100 safe (e.g. by causing an autonomous vehicle comprising the processing system 100 to safely slow down and pull over, or by switching to a redundant processing system also comprised by that autonomous vehicle). Alternatively, or additionally, the processing unit 116 may itself use the fault signal. For example, the processing unit 116 may log fault signals and the processing instance(s) those faults are associated with—and, for example, if one or more processing instances exceed a predefined number of faults (perhaps within some defined time period), those one or more processing instances may be disabled or otherwise prevented from processing future mission instructions.

Testing a processing unit in accordance with the principles described herein is also advantageous because, relative to the first typical testing method described herein, it enables a greater percentage of the parallel processing engines' processing power and time to be used to perform mission work. This is because according to the principles described herein only one processing cycle is used to process the test instruction at each of the plurality of processing instances so as to generate test outputs for self-comparison. By contrast, in the first typical testing method described herein, both a mission workgroup and a redundant workgroup, in their entirety, must be processed so as to generate a mission result and a redundant result for comparison—which can use many more processing cycles.

What's more, the inventors have observed that, often, in practice, mission instructions are not scheduled for processing during every processing cycle of a parallel processing engine. This is particularly the case in example processing units comprising a plurality of parallel processing engines to which a scheduler can schedule mission instructions—e.g. where the parallel processing engine to which an instruction is scheduled depends on the type of processing required by that instruction (e.g. integer, floating-point, complex etc), potentially leaving parallel processing engines configured to perform other types of processing temporarily idle. A processing cycle of a parallel processing engine during which that parallel processing engine is not scheduled (e.g. by scheduler 218 shown in FIG. 2) to process any other (e.g. mission or non-test) instructions can be termed an "idle cycle". The inventors have observed that parallel processing engines often experience a number of idle cycles. This can be exploited in preferable examples.

Preferably, test instruction insertion logic 424 can be configured to identify an idle cycle (as defined herein) of the parallel processing engine 422. Controller 440 of test instruction insertion logic 424 may be configured to identify an idle cycle (e.g. an upcoming or future idle cycle) of the parallel processing engine 422. For example, controller 440 may monitor an incoming mission workgroup queue (e.g. buffer) (not shown in the Figures) for the parallel processing engine 442—and identify when a "gap" in the incoming queue will lead to the parallel processing engine experiencing one or more idle cycles.

Test instruction insertion logic 424 may be configured to insert test instructions for processing only during identified idle cycles. Configuring the test instruction insertion logic 424 in this way is advantageous because it can prevent the processing of a test instruction disrupting (e.g. delaying) the processing of a mission instruction—e.g. by preventing the processing of a test instruction consuming a processing cycle of a parallel processing engine that would otherwise have been used to process a mission instruction.

As described herein, the processing unit 116 may comprise a scheduler 218 configured to schedule other (e.g. mission or non-test) instructions to be processed by the parallel processing engine 442. Test instruction insertion logic 424 may act independently of the scheduler 218. That is, test instruction insertion logic 424 may be configured to insert test instructions for processing independently of (e.g. without the "consent" or "knowledge" of) the scheduler 218. In other words, the scheduler 218 need not be "aware" that the test instruction insertion logic 424 exists, and/or that the test instruction insertion logic 424 is inserting test instructions for processing by the parallel processing engine. Put another way, in preferred examples, the test instruction insertion logic 424 is not under the control of the scheduler 218.

Test instruction insertion logic 424 may be configured to, prior to inserting a test instruction for processing, identify that one or more other (e.g. mission or non-test) instructions have been processed by the parallel processing engine 422 (e.g. within a predetermined period of time prior to the current time). For example, controller 440 may comprise a mission countdown timer (not shown in the Figures). The mission countdown timer may be set to expire after the predetermined period of time (e.g. 100 ms or any other suitable period of time). The mission countdown timer may be reset to the predetermined period of time each time a mission instruction is processed by the parallel processing engine 422. Test instruction insertion logic 424 may be configured to not insert test instructions for processing if the mission countdown timer has expired. In other words, test instruction insertion logic 424 may be configured to establish that the parallel processing engine 422 is active (e.g. being used to perform mission work) before initiating a test of the processing instances 3 of that parallel processing engine 422. Configuring the test instruction insertion logic 424 in this way is advantageous because it can save processing power (e.g. of the processing unit) by eliminating unnecessary testing of unused (e.g. inactive) parallel processing engines. This can be particularly advantageous in example processing units comprising a plurality of parallel processing engines to which a scheduler can schedule mission instructions. In these examples, the majority of the plurality of parallel processing engines comprised by a processing unit might be unused (e.g. inactive) at any given time.

As described herein, in automotive application examples, in order to be certified as meeting the ASIL B or ASIL D standards of ISO 26262, it may need to be demonstrated that a range of different faults that might occur at a processing unit can be detected within a predetermined time period of those faults occurring.

As described herein, operand data may be processed in accordance with a test instruction. The test instruction may comprise control information that defines the operation(s) to be performed by the processing instances on that operand data. The operand data to be processed in accordance with a test instruction and the control information comprised by that test instruction can be referred to as a "test instruction control information-operand data combination". In other words, for a test instruction control information-operand data combination, operand data is processed in accordance with that test instruction, and that test instruction comprises control information that defines the operation(s) to be performed by the plurality of processing instances on that operand data. The test instruction insertion logic 424 may be configured to insert a plurality of different test instruction control information-operand data combinations for processing (e.g. over a plurality of different processing cycles) by each of the plurality of processing instances. The plurality of different test instruction control information-operand data combinations may comprise: one or more different sets of operand data each to be processed in accordance with a test instruction comprising the same control information; a set of operand data to be processed in accordance with one or more test instructions comprising different control information; and/or one or more different sets of operand data each to be processed in accordance with one or more test instructions comprising different control information. That is, the operand data and/or the control information may vary between different test instruction control information-operand data combinations of the plurality of different test instruction control information-operand data combinations.

The plurality of different test instruction control information-operand data combinations may be configured to, cumulatively, cover (e.g. use or exercise) at least a predetermined percentage of the logic comprised by the parallel processing engine. The percentage may be 90%, or any other suitable percentage. Using a part of the logic comprised by the parallel processing engine when processing a test instruction control information-operand data combination as described herein may expose a fault in that part of the logic. Thus, using a plurality of different test instruction control information-operand data combinations that cover at least a predetermined percentage of the logic comprised by the parallel processing engine can enable it to be demonstrated that a range of different faults that might occur at a processing unit can be detected.

The plurality of different test instruction control information-operand data combinations may comprise one or more test instruction control information-operand data combinations generated (as described herein) by the test instruction insertion logic 424 and one or more pre-generated (e.g. "top-up") test instruction control information-operand data combinations stored by the test instruction insertion logic 424. This can advantageously use less memory relative to pre-generating and storing each of the plurality of different test instruction control information-operand data combinations. At least one set of one or more pre-generated operand values and at least one set of one or more pre-generated control fields may be stored in private memory 432 at the parallel processing engine 422. By way of example, in order to output a generated test instruction control information-operand data combination, multiplexers 434 and 436 shown in FIG. 4 may be set to "1" so as to select a set of one or more pseudo-randomly generated operand values output by LFSR

428 and one or more constrained-randomly generated control fields output by CRGL 430. In order to output a pre-generated test instruction control information-operand data combination, multiplexers 434 and 436 shown in FIG. 4 may be set to "0" so as to select a set of one or more pre-generated operand values stored in private memory 432 and one or more pre-generated control fields stored in private memory 432. For example, controller 440 may be configured to control multiplexers 434 and 436.

The one or more predetermined seeds (e.g. as stored in "seed(s)" 426) and the one or more pre-generated test instruction control information-operand data combinations (e.g. as stored in private memory 432) can be predetermined/pre-generated by building a testbench that emulates the parallel processing engine 422 (e.g. including the test instruction insertion logic 424, the plurality of processing instances 3 and the check logic 438). That testbench can be run within a fault simulation (e.g. fault injection) EDA tool that is able to determine which faults (e.g. hardware faults in the processing logic of that parallel processing engine) would be detected by different test instruction control information-operand data combinations running in the simulation. This allows many potential seeds to be trialled and the best seed(s) of those selected (e.g. the seed(s) that lead to the detection of the greatest range of faults, and/or lead to the fewest top-up test instruction control information-operand data combinations being required). It also allows many candidate top-up test instruction control information-operand data combinations to be trialled and the best one(s) of those selected (e.g. the top-up test instruction control information-operand data combination(s) that lead to the detection of the greatest range of faults, and/or lead to the fewest top-up test instruction control information-operand data combinations being required). The number of (and specific one(s) of) the top-up test instruction control information-operand data combinations selected may vary depending on which one or more of the potential seeds are selected.

The test instruction insertion logic 424 may be configured to insert, within a predetermined period of time, each of the plurality of different test instruction control information-operand data combinations for processing by each of the plurality of processing instances. This can enable it to be demonstrated that a range of different faults that might occur at a processing unit can be detected within that predetermined period of time.

For example, in a first approach, controller 440 may comprise a test countdown timer (not shown in the Figures). The test countdown timer may be set to expire after the predetermined period of time (e.g. 100 ms or any other suitable period of time). The test countdown timer may be started (e.g. begin counting down) when a mission instruction is received for processing at the parallel processing engine 422. The test instruction insertion logic 424 may be configured to identify (e.g. by controller 440 monitoring the started test countdown timer) that less than a threshold amount of time of the predetermined period of time is remaining and/or greater than a threshold number of test instruction control information-operand data combinations of the plurality of different test instruction control information-operand data combinations are yet to be processed within the predetermined period of time. In response to said identifying, the test instruction insertion logic 424 may be configured to insert the remaining test instruction control information-operand data combinations of the plurality of different test instruction control information-operand data combinations and enforce that they take priority over scheduled mission instructions, and/or cause one or more idle cycles of the parallel processing engine into which the remaining test instruction control information-operand data combinations of the plurality of different test instruction control information-operand data combinations can be inserted. The test instruction insertion logic 424 may be configured to cause one or more idle cycles of the parallel processing engine by causing a scheduler (e.g. scheduler 218) configured to schedule other (e.g. mission or non-test) instructions for processing by the parallel processing engine to not schedule other (e.g. mission or non-test) instructions for processing by the parallel processing engine during one or more cycles of the parallel processing engine (those cycles thereby becoming idle cycles). This can enable the test instruction insertion logic 424 to insert the remaining test instruction control information-operand data combinations of the plurality of different test instruction control information-operand data combinations into those idle cycles for processing before the predetermined period of time expires.

In an example of this first approach, controller 440 may comprise multiple test countdown timers as described in the preceding paragraph—each set to expire after the predetermined period of time (e.g. 100 ms or any other suitable period of time). A separate test countdown timer of the multiple test countdown timers may be started (e.g. begin counting down) each time a mission instruction is received for processing at the parallel processing engine 422. The test instruction insertion logic 424 may use each of the test countdown timers as described in the preceding paragraph. In this way, the test instruction insertion logic 424 may be configured to enforce that each of the plurality of test instruction control information-operand data combinations are processed within each of the predetermined periods of time set by each of the started (e.g. counting down) test countdown timers. Further, in this example, test instruction insertion logic 424 may be configured to only insert test instructions for processing by parallel processing engine 422 when at least one of the multiple test countdown timers comprised by controller 440 is counting down. This is another way in which the test instruction insertion logic 424 can be configured to establish that the parallel processing engine 422 is active (e.g. being used to perform mission work) before inserting test instructions for processing by that parallel processing engine 422.

In a second approach, a fault detection time limit (e.g. 100 ms, as may be specified in a safety standard) can be divided by two, to provide a test window (e.g. a 50 ms test window). The test instruction insertion logic 424 can be configured to establish whether a parallel processing engine 422 is active (e.g. being used to perform mission work). In response to the test instruction insertion logic 424 establishing that a parallel processing engine 422 is active within a test window (e.g. test window N) (e.g. at any point within that test window), the test instruction insertion logic 424 may be configured to insert each of the plurality of different test instruction control information-operand data combinations for processing by each of the plurality of processing instances within the subsequent test window (e.g. test window N+1) (e.g. where the "test window" is "the predetermined period of time", in this second approach). This second approach can enable any fault that can be detected by the plurality of different test instruction control information-operand data combinations to be detected within the fault detection time limit (e.g. 100 ms). This second approach is particularly suitable where the number of cycles required to process the plurality of different test instruction control information-operand data combinations is significantly less than the number of cycles in the test window. For example, it might be expected that a suitable plurality of different test instruction control information-operand data combinations would require 100,000 cycles to process, whilst a 50 ms test window might have 50 million cycles—and so the power overhead of processing the plurality of different test instruction control information-operand data combinations every 50 ms test window is negligible.

Figure 5:
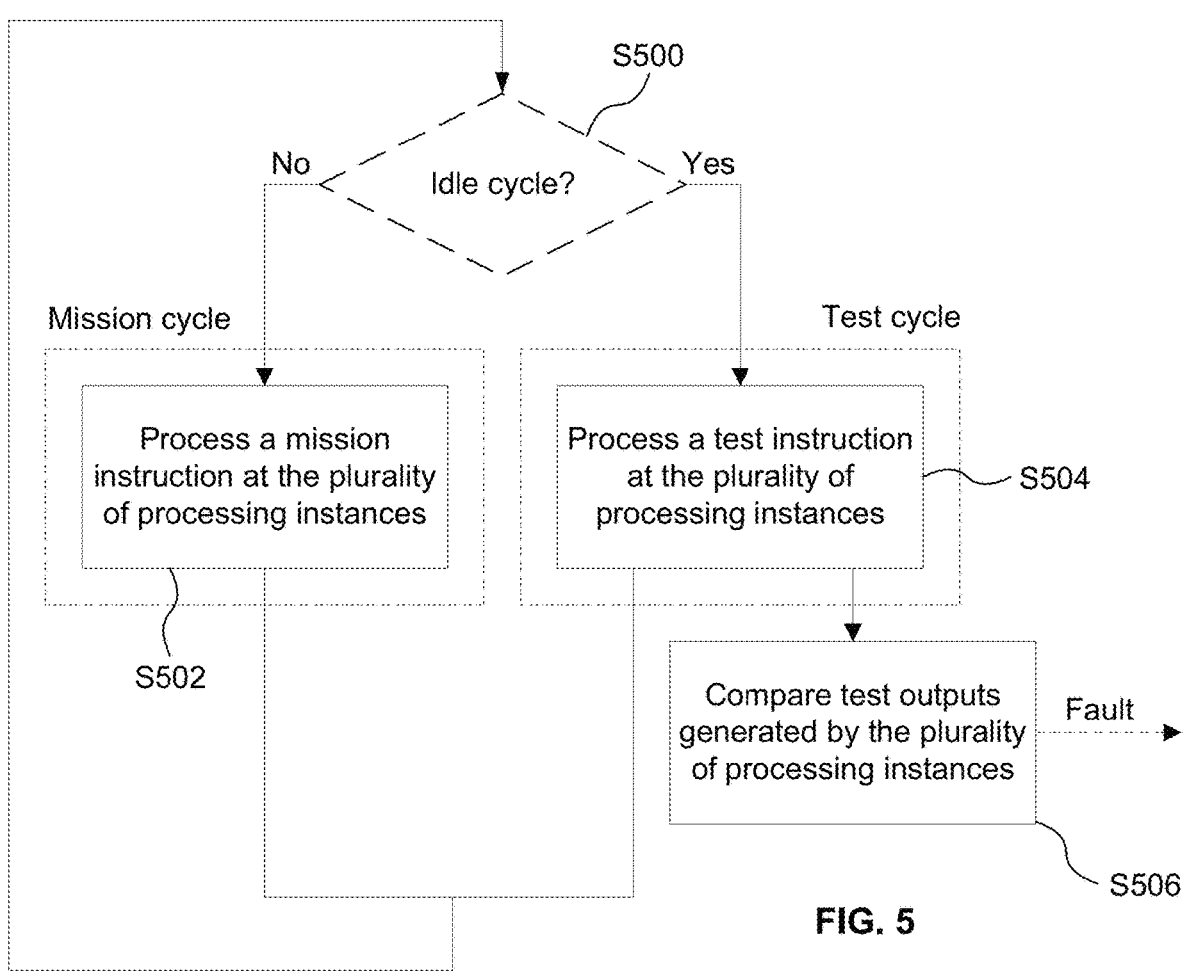
FIG. 5 shows a method of processing instructions at a processing unit configured to perform parallel processing according to the principles described herein.

FIG. 5 shows a method of processing instructions at a processing unit configured to perform parallel processing according to the principles described herein. The method of FIG. 5 can be performed by the processing unit 116 as described herein with reference to FIG. 2, that processing unit 116 comprising one or more parallel processing engines 422 as described herein with reference to FIG. 4.

As described herein, during a processing cycle of a parallel processing engine (e.g. parallel processing engine 422 shown in FIG. 4), a number of sets of one or more operand values equal to the number of processing instances of that parallel processing engine can be processed in accordance with the same instruction, in parallel. In the following, a processing cycle of a parallel processing engine in which a mission (e.g. non-test) instruction is processed by each of the processing instances in parallel can be referred to as a "mission cycle", and a processing cycle of a parallel processing engine in which a test instruction is processed by each of the processing instances in parallel can be referred to as a "test cycle". Preferably, a test cycle occurs during an idle cycle (as defined herein) of a parallel processing engine—although this need not be the case.

Returning to FIG. 5, optionally, in step S500, it can be determined whether a next processing cycle of a parallel processing engine is an idle cycle. As described herein, an "idle cycle" is a processing cycle of a parallel processing engine during which that parallel processing engine is not scheduled (e.g. by scheduler 218 shown in FIG. 2) to process any other (e.g. mission or non-test) instructions. Test instruction insertion logic 424 described herein with reference to FIG. 4 may be configured to perform step S500.

In response to determining that the next processing cycle of the parallel processing engine is not an idle cycle, no further action may be taken (e.g. by test instruction insertion logic 424) with respect to that next processing cycle. As such, in step S502 of FIG. 5, during that next processing cycle, a mission (e.g. non-test) instruction can be processed, in parallel, by the plurality of processing instances of the parallel processing engine so as to generate a respective plurality of mission outputs. That is, that next processing cycle is a mission cycle. After completing step S502, the method of FIG. 5 may return to step S500 such that the method of FIG. 5 is repeated for a subsequent processing cycle.

During a mission cycle, each of the plurality of processing instances can operate on different operand data in accordance with the mission instruction. For example, during a mission cycle, eight different sets of one or more mission operand values can be processed, in accordance with a mission instruction, in parallel, at the plurality of processing instances 3 of parallel processing engine 422. For example, considering only the first processing instance (PI1) 3-1 and the second processing instance (PI2) 3-2 for conciseness, during a mission cycle as shown in step S502 of FIG. 5, a first set of one or more mission operand values can be processed in accordance with a mission instruction at the first processing instance (PI1) 3-1 so as to generate a first mission output and, in parallel, a second set of one or more mission operand values can be processed in accordance with that mission instruction at the second processing instance (PI2) 3-2 so as to generate a second mission output—the first set of one or more mission operand values being different to the second set of one or more mission operand values.

Alternatively, in response to determining in step S500 that the next processing cycle of the parallel processing engine 422 is an idle cycle, in step S504 of FIG. 5, a test instruction may be inserted for processing by each of the plurality of processing instances of the parallel processing engine so as to generate a respective plurality of test outputs. That is, that next processing cycle is a test cycle. After completing step S504, the method of FIG. 5 may return to step S500 such that the method of FIG. 5 is repeated for a subsequent processing cycle.

During a test cycle, each of the plurality of processing instances can operate on the same operand data in accordance with the test instruction. For example, during a test cycle, eight identical sets of one or more test operand values can be processed, in accordance with a test instruction, in parallel, at the plurality of processing instances 3 of parallel processing engine 422. For example, considering only the first processing instance (PI1) 3-1 and the second processing instance (PI2) 3-2 for conciseness, during a test cycle as shown in step S504 of FIG. 5, a first set of one or more test operand values can be processed in accordance with a test instruction at the first processing instance (PI1) 3-1 so as to generate a first test output and, in parallel, a second set of one or more test operand values can be processed in accordance with that test instruction at the second processing instance (PI2) 3-2 so as to generate a second test output—the first set of one or more test operand values being the same as (e.g. identical to) the second set of one or more test operand values.

In step S506 of FIG. 5, test outputs generated during the test phase by the plurality of processing instances can be compared, and a fault signal can be raised if (e.g. in response to determining that) the compared test outputs do not match—as described herein. For example, considering again only the first processing instance (PI1) 3-1 and the second processing instance (PI2) 3-2 for conciseness, in step S506, the first test output as generated by the first processing instance (PI1) 3-1 and the second test output as generated by the second processing instance (PI2) 3-2 can be compared—and a fault signal can be raised if the compared test outputs do not match.

As described herein, step S500 of FIG. 5 is optional. That is, in other examples, test instruction insertion logic 424 need not determine whether a next processing cycle of a parallel processing engine is an idle cycle before inserting a test instruction for processing. For example, test instruction insertion logic 424 may periodically insert test instructions for processing (e.g. independent of whether or not mission instructions are scheduled for processing at the parallel processing engine during a next processing cycle). That is, test instruction insertion logic 424 may insert test instructions for processing according to a predetermined test frequency. Said test instructions may be given priority over scheduled mission instructions—e.g. delaying the processing of those scheduled mission instructions, or even displacing those scheduled mission instructions such that they must be re-submitted for processing in subsequent processing cycles. Alternatively, said test instructions may join a queue of instructions (e.g. including mission instructions) to be processed at the parallel processing engine. In these examples, whether the next processing cycle (e.g. the next pass of FIG. 5) is a mission cycle (S502) or a test cycle (S504) depends on whether a test instruction has been inserted for processing during that processing cycle.

Multiple passes of the method if FIG. 5 can be performed. That is, instructions (e.g. mission and test instructions) can be processed at the parallel processing engine during a plurality of cycles of the parallel processing engine. As such, the plurality of cycles may comprise one or more mission cycles and one or more test cycles. x % of the plurality of cycles may be mission cycles and (100–x)% of the plurality of cycles may be test cycles. In an example, x may be greater than 50. In increasingly preferable examples, x may be greater than or equal to: 55; 60; 65; 70; 75; 80; 85; 90; or 95. This reflects that, according to the principles described herein, a greater percentage of the parallel processing engines' processing power and time can be used to perform mission work than is used performing testing of that processing unit.

It is to be understood that the processing unit described herein, and the method of processing instructions at a processing unit described herein, need not be used for safety critical processing and/or in automotive applications. For example, the processing unit described herein, and/or the method of processing instructions at a processing unit described herein, could be used in super-computing applications.

Figure 6:
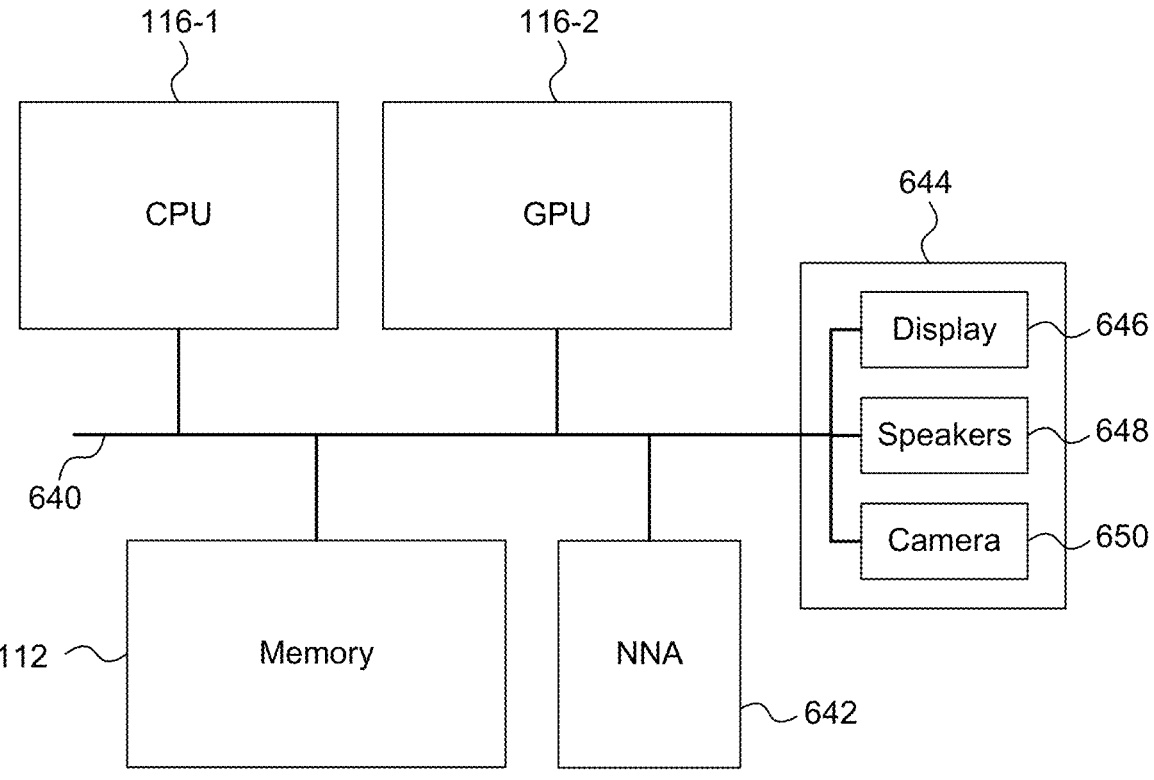
FIG. 6 shows a computer system in which processing unit configured to perform parallel processing can be implemented.

FIG. 6 shows a computer system in which the processing unit described herein may be implemented. The computer system comprises a CPU 116-1, a GPU 116-2, a memory 112, a neural network accelerator (NNA) 642 and other devices 644, such as a display 646, speakers 648 and a camera 650. In other examples, one or more of the depicted components may be omitted from the system. The components of the computer system can communicate with each other via a communications bus 640.

The processing system, processing unit and parallel processing engines of FIGS. 1 to 4 are shown as comprising a number of functional blocks. This is schematic only and is not intended to define a strict division between different logic elements of such entities. Each functional block may be provided in any suitable manner. It is to be understood that intermediate values described herein as being formed by a processing system, processing unit or parallel processing engine need not be physically generated by the processing system, processing unit or parallel processing engine at any point and may merely represent logical values which conveniently describe the processing performed by the processing system, processing unit or parallel processing engine between its input and output.

The processing system, processing unit or parallel processing engine described herein may be embodied in hardware on an integrated circuit. The processing system, processing unit or parallel processing engine described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processing system, processing unit or parallel processing engine configured to perform any of the methods described herein, or to manufacture a processing system, processing unit or parallel processing engine comprising any apparatus described herein. An integrated circuit definition dataset may be, for example, an integrated circuit description.

Therefore, there may be provided a method of manufacturing, at an integrated circuit manufacturing system, a processing system, processing unit or parallel processing engine as described herein. Furthermore, there may be provided an integrated circuit definition dataset that, when processed in an integrated circuit manufacturing system, causes the method of manufacturing a processing system, processing unit or parallel processing engine to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processing system, processing unit or parallel processing engine will now be described with respect to FIG. 7.

Figure 7:
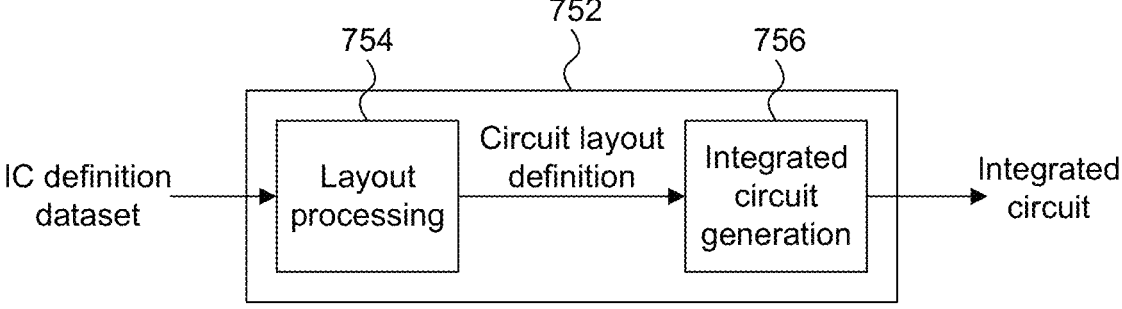
FIG. 7 shows an integrated circuit manufacturing system for generating an integrated circuit embodying a graphics processing system.

FIG. 7 shows an example of an integrated circuit (IC) manufacturing system 752 which is configured to manufacture a processing system, processing unit or parallel processing engine as described in any of the examples herein. In particular, the IC manufacturing system 752 comprises a layout processing system 754 and an integrated circuit generation system 756. The IC manufacturing system 752 is configured to receive an IC definition dataset (e.g. defining a processing system, processing unit or parallel processing engine as described in any of the examples herein), process the IC definition dataset, and generate an IC according to the IC definition dataset (e.g. which embodies a processing system, processing unit or parallel processing engine as described in any of the examples herein). The processing of the IC definition dataset configures the IC manufacturing system 752 to manufacture an integrated circuit embodying a processing system, processing unit or parallel processing engine as described in any of the examples herein.

The layout processing system 754 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 754 has determined the circuit layout it may output a circuit layout definition to the IC generation system 756. A circuit layout definition may be, for example, a circuit layout description.

The IC generation system 756 generates an IC according to the circuit layout definition, as is known in the art. For example, the IC generation system 756 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 756 may be in the form of computer-readable code which the IC generation system 756 can use to form a suitable mask for use in generating an IC.

The different processes performed by the IC manufacturing system 752 may be implemented all in one location, e.g. by one party. Alternatively, the IC manufacturing system 752 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing system, processing unit or parallel processing engine without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing instructions at a processing unit configured to perform parallel processing, the processing unit comprising a parallel processing engine, the parallel processing engine comprising a first processing instance and a second processing instance, the method comprising:

during a mission cycle:

processing a first set of one or more mission operand values in accordance with a mission instruction at the first processing instance so as to generate a first mission output; and in parallel, processing a second set of one or more mission operand values in accordance with the mission instruction at the second processing instance so as to generate a second mission output;

wherein the first set of one or more mission operand values is different to the second set of one or more mission operand values; and during a test cycle:

processing a first set of one or more test operand values in accordance with a test instruction at the first processing instance so as to generate a first test output; and in parallel, processing a second set of one or more test operand values in accordance with the test instruction at the second processing instance so as to generate a second test output;

wherein the first set of one or more test operand values is the same as the second set of one or more test operand values;

comparing the first test output and the second test output; and raising a fault signal if the compared test outputs do not match.

2. The method of claim 1, wherein the test cycle occurs during an idle cycle of the parallel processing engine, wherein an idle cycle is a cycle of the parallel processing engine during which the parallel processing engine is not scheduled to process any mission instructions.

3. The method of claim 1, further comprising:

identifying an idle cycle of the parallel processing engine during which the parallel processing engine is not scheduled to process any mission instructions; and inserting the test instruction for processing, during the idle cycle, by the first processing instance and the second processing instance.

4. The method of claim 1, further comprising processing instructions at the parallel processing engine during a plurality of cycles of the parallel processing engine, the plurality of cycles comprising one or more mission cycles and one or more test cycles, wherein x % of the plurality of cycles are mission cycles and (100−x)% of the plurality of cycles are test cycles.

5. The method of claim 4, wherein x>50.

6. The method of claim 1, wherein the mission instruction defines a portion of work to perform for the first processing instance and the second processing instance.

7. The method of claim 6, wherein the work comprises one or more of image processing, video processing, graphics processing and/or general processing.

8. The method of claim 6, wherein the work is safety-critical work.

9. The method of claim 1, wherein the first processing instance is identical to the second processing instance.

10. The method of claim 1, wherein the first test output and the second test output are not written to a memory external of the parallel processing engine.

11. The method of claim 1, further comprising:

scheduling, using a scheduler, the mission instruction for processing by the first processing instance and the second processing instance; and inserting, using test instruction insertion logic, the test instruction for processing by the first processing instance and the second processing instance;

wherein the test instruction insertion logic acts independently of the scheduler.

12. The method of claim 11, wherein the test instruction insertion logic is implemented in fixed function hardware.

13. The method of claim 1, further comprising pseudo-randomly generating the one or more test operand values using test instruction insertion logic.

14. The method of claim 1, wherein the test instruction comprises one or more control fields that define the operation(s) to be performed by the processing instances on their respective set of operand values, the one or more control fields being pre-generated.

15. The method of claim 1, further comprising comparing the first test output and the second test output using check logic implemented in fixed function hardware.

16. The method of claim 1, wherein the processing unit is a graphics processing unit (GPU) or a central processing unit (CPU).

17. The method of claim 1, wherein the parallel processing engine is an integer pipeline, a floating-point pipeline or a complex pipeline.

18. The method of claim 1, the parallel processing engine being configured to perform Single Instruction Multiple Data (SIMD) processing.

19. A processing unit configured to perform parallel processing, the processing unit comprising a parallel processing engine, the parallel processing engine comprising a first processing instance and a second processing instance, the parallel processing engine being configured to:

during a mission cycle:

process a first set of one or more mission operand values in accordance with a mission instruction at the first processing instance so as to generate a first mission output; and in parallel, process a second set of one or more mission operand values in accordance with the mission instruction at the second processing instance so as to generate a second mission output;

wherein the first set of one or more mission operand values is different to the second set of one or more mission operand values; and during a test cycle:

process a first set of one or more test operand values in accordance with a test instruction at the first processing instance so as to generate a first test output; and in parallel, process a second set of one or more test operand values in accordance with the test instruction at the second processing instance so as to generate a second test output;

wherein the first set of one or more test operand values is the same as the second set of one or more test operand values;

compare the first test output and the second test output; and raise a fault signal if the compared test outputs do not match.

20. An integrated circuit manufacturing system comprising:

a layout processing system configured to process a computer readable dataset description so as to generate a circuit layout description of an integrated circuit embodying a processing unit; and an integrated circuit generation system configured to manufacture the processing unit according to the circuit layout description;

wherein the processing unit is configured to perform parallel processing, the processing unit comprising a parallel processing engine, the parallel processing engine comprising a first processing instance and a second processing instance, the parallel processing engine being configured to:

during a mission cycle:

process a first set of one or more mission operand values in accordance with a mission instruction at the first processing instance so as to generate a first mission output; and in parallel, process a second set of one or more mission operand values in accordance with the mission instruction at the second processing instance so as to generate a second mission output;

wherein the first set of one or more mission operand values is different to the second set of one or more mission operand values; and during a test cycle:

process a first set of one or more test operand values in accordance with a test instruction at the first processing instance so as to generate a first test output; and in parallel, process a second set of one or more test operand values in accordance with the test instruction at the second processing instance so as to generate a second test output;

wherein the first set of one or more test operand values is the same as the second set of one or more test operand values;

compare the first test output and the second test output; and raise a fault signal if the compared test outputs do not match.

* * * * *